(12) United States Patent
Baek et al.

(10) Patent No.: US 12,483,986 B2
(45) Date of Patent: Nov. 25, 2025

(54) METHOD FOR REQUESTING INFORMATION ON RESTRICTED TWT IN WIRELESS LAN SYSTEM AND DEVICE USING SAME METHOD

(71) Applicant: LG ELECTRONICS INC., Seoul (KR)

(72) Inventors: Sunhee Baek, Seoul (KR); Jeongki Kim, Seoul (KR); Jinsoo Choi, Seoul (KR); Namyeong Kim, Seoul (KR); Insun Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 317 days.

(21) Appl. No.: 18/273,247

(22) PCT Filed: Jan. 28, 2022

(86) PCT No.: PCT/KR2022/001582
§ 371 (c)(1),
(2) Date: Jul. 19, 2023

(87) PCT Pub. No.: WO2022/164258
PCT Pub. Date: Aug. 4, 2022

(65) Prior Publication Data
US 2024/0114455 A1     Apr. 4, 2024

(30) Foreign Application Priority Data
Jan. 29, 2021 (KR) .................. 10-2021-0013418

(51) Int. Cl.
*H04W 52/02* (2009.01)
*H04W 74/0816* (2024.01)
*H04W 84/12* (2009.01)

(52) U.S. Cl.
CPC .... *H04W 52/0235* (2013.01); *H04W 52/0216* (2013.01); *H04W 74/0816* (2013.01); *H04W 84/12* (2013.01)

(58) Field of Classification Search
CPC .. H04W 52/02; H04W 74/0816; H04W 84/12
See application file for complete search history.

(56) References Cited

U.S. PATENT DOCUMENTS

2011/0199952 A1\* 8/2011 Seok ................. H04W 52/02
                                                              370/311
2013/0235773 A1\* 9/2013 Wang ............... H04W 52/0206
                                                              370/311
(Continued)

FOREIGN PATENT DOCUMENTS

| KR | 102029330 | 10/2019 |
| KR | 20200013017 | 2/2020 |
| WO | 2020013874 | 1/2020 |

OTHER PUBLICATIONS

Baron, et al. "Low-Latency Triggered TWT," IEEE 802.11-20/1843r2 dated Dec. 16, 2020.
(Continued)

*Primary Examiner* — Mohammad S Anwar
(74) *Attorney, Agent, or Firm* — BRYAN CAVE LEIGHTON PAISNER LLP

(57) ABSTRACT

The specification proposes a method for requesting information on a restricted TWT when an STA has failed to receive the information. According to an embodiment of the present specification, when an STA fails to acquire information on a restricted TWT, the STA may transmit, to an AP, a signal for requesting the information on the restricted TWT after a certain time elapses from a TBTT. The signal may be transmitted independently or may be transmitted together with another signal transmitted by the STA.

13 Claims, 21 Drawing Sheets

(56) References Cited

U.S. PATENT DOCUMENTS

2017/0064633 A1\* 3/2017 Jia ..................... H04W 52/0225
2017/0195954 A1   7/2017 Ghosh
2018/0310245 A1\* 10/2018 Ouchi ............... H04W 52/0238
2019/0246354 A1   8/2019 Huang et al.

OTHER PUBLICATIONS

Hong et al. "MU-RTS/CTS for TWT Protection," IEEE 802.11-16/0353r1, 13 pages, Mar. 2016.

\* cited by examiner (a)

(b)

METHOD FOR REQUESTING INFORMATION ON RESTRICTED TWT IN WIRELESS LAN SYSTEM AND DEVICE USING SAME METHOD

CROSS-REFERENCE TO RELATED APPLICATIONS

This application is the National Stage filing under 35 U.S.C. 371 of International Application No. PCT/KR2022/001582, filed on Jan. 28, 2022, which claims the benefit of Korean Patent Application No. 10-2021-0013418, filed on Jan. 29, 2021, which are all hereby incorporated by reference herein in their entirety.

TECHNICAL FIELD

The present disclosure is related to a wireless local area network (LAN) system.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The recent explosion in wired and wireless traffic has led to a significant increase in time-delay sensitive traffic. Time-delay sensitive traffic is characterized by real-time audio/video transmissions, and the proliferation of multimedia devices has increased the need to support it in wireless environments. However, there are more considerations for supporting time-delay sensitive traffic in a wireless environment than in a wired environment. This is because the transmission rate is lower than wired, and there is also the issue of interference from the surrounding area.

In particular, Wi-Fi is relatively more difficult to support time-delay sensitive traffic because it is a communication system that must compete equally in the ISM band without channel monopolization by a central base station. However, as described above, time-delay sensitive traffic has been increasing in recent years and Wi-Fi technology is needed to support it. This disclosure proposes techniques for supporting time-delay sensitive traffic.

SUMMARY

The present disclosure proposes a method for requesting information about a restricted TWT when the STA has not received the information about the restricted TWT. According to one embodiment of the present disclosure, if the STA has not obtained information about the restricted TWT, the STA may transmit a signal to the AP requesting information about the restricted TWT after a period of time has elapsed since the TBTT. The signal may be transmitted independently or in conjunction with other signals transmitted by the STA.

According to this specification, a method is proposed for obtaining the above information even if the STA has not obtained the information about the restricted TWT. Therefore, the restricted TWT SP can be protected. Furthermore, the transmission and reception of latency sensitive data/traffic can be ensured more efficiently.

DESCRIPTION OF EXEMPLARY EMBODIMENTS

Figure 1:
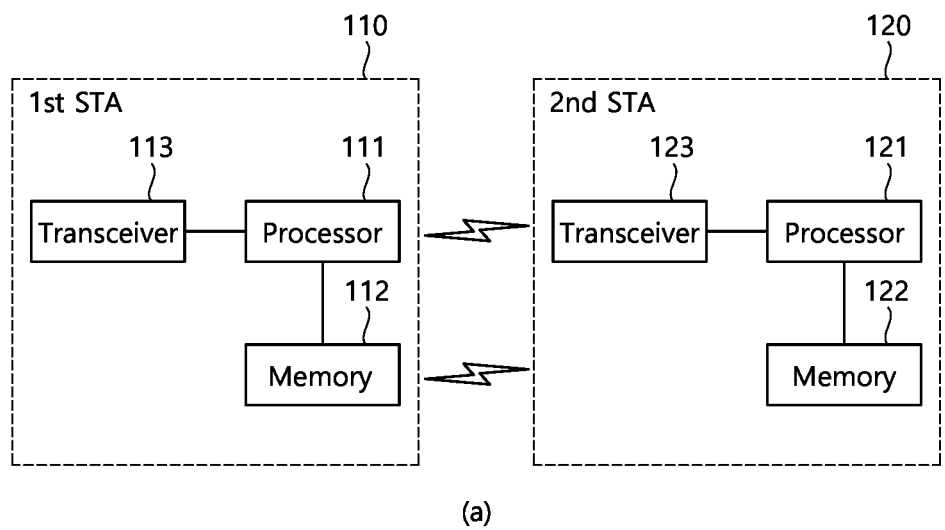
FIG. 1 shows an example of a transmitting apparatus and/or receiving apparatus of the present specification.
Figure 1:
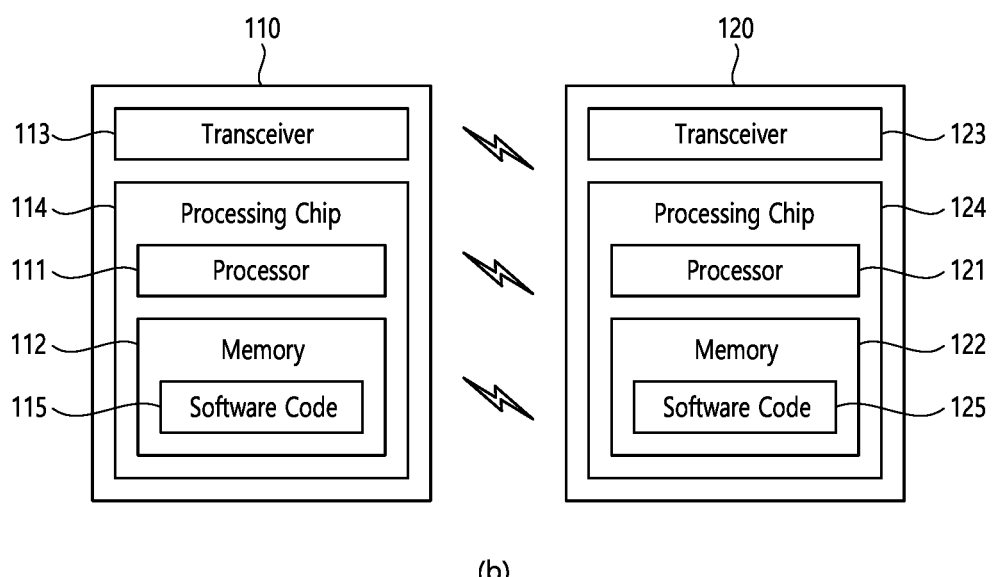

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP. In the present specification, the AP may be indicated as an AP STA.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, an STA1, an STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
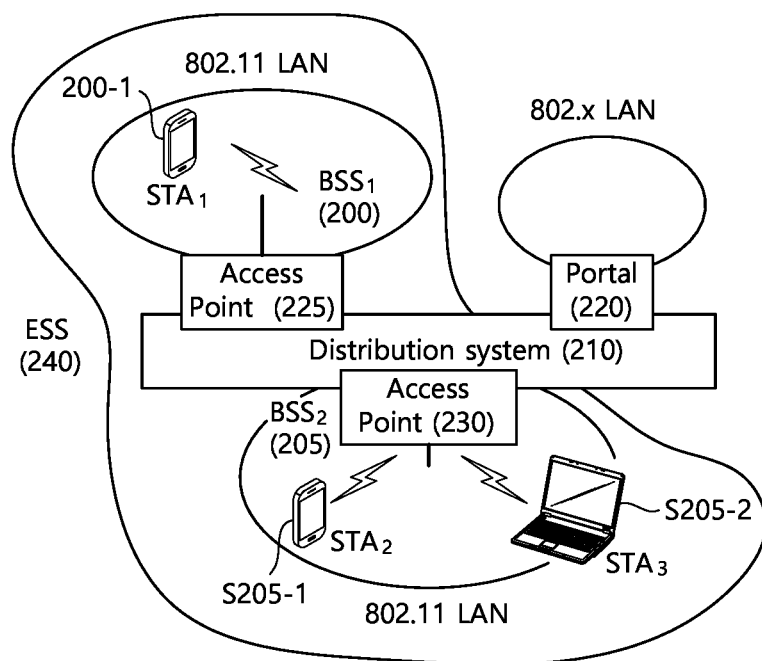
FIG. 2 is a conceptual view illustrating the structure of a wireless local area network (WLAN).
Figure 2:
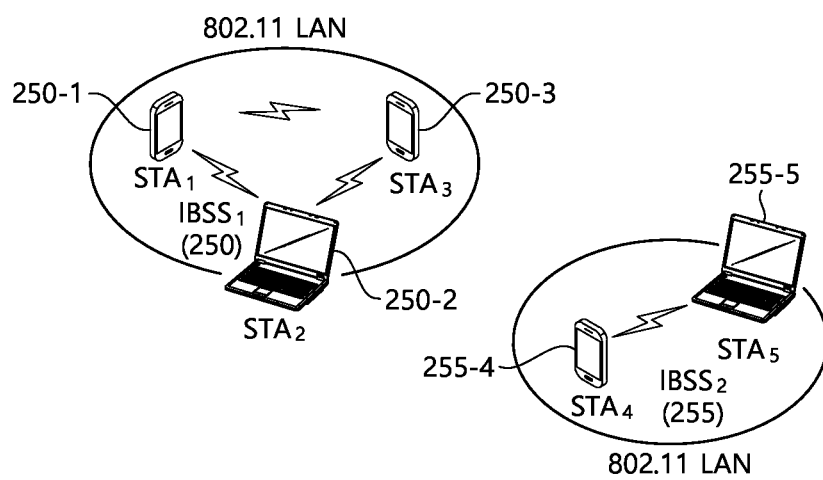

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
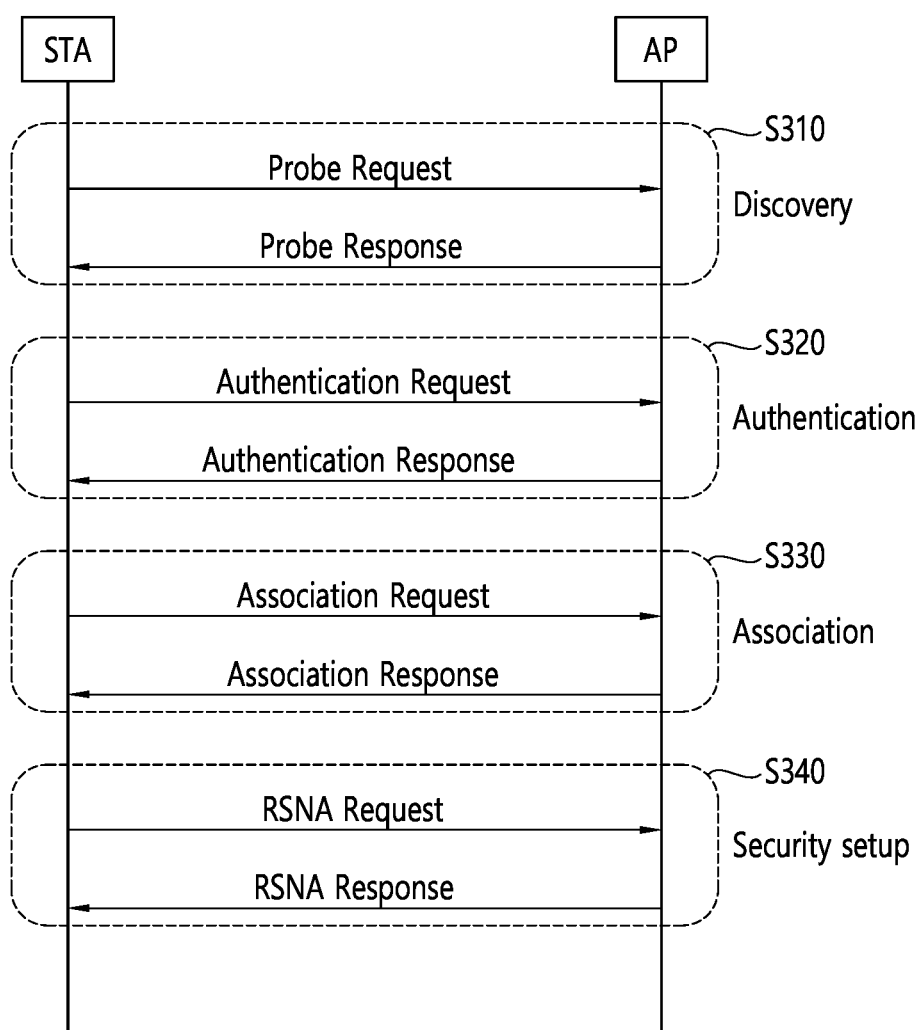
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
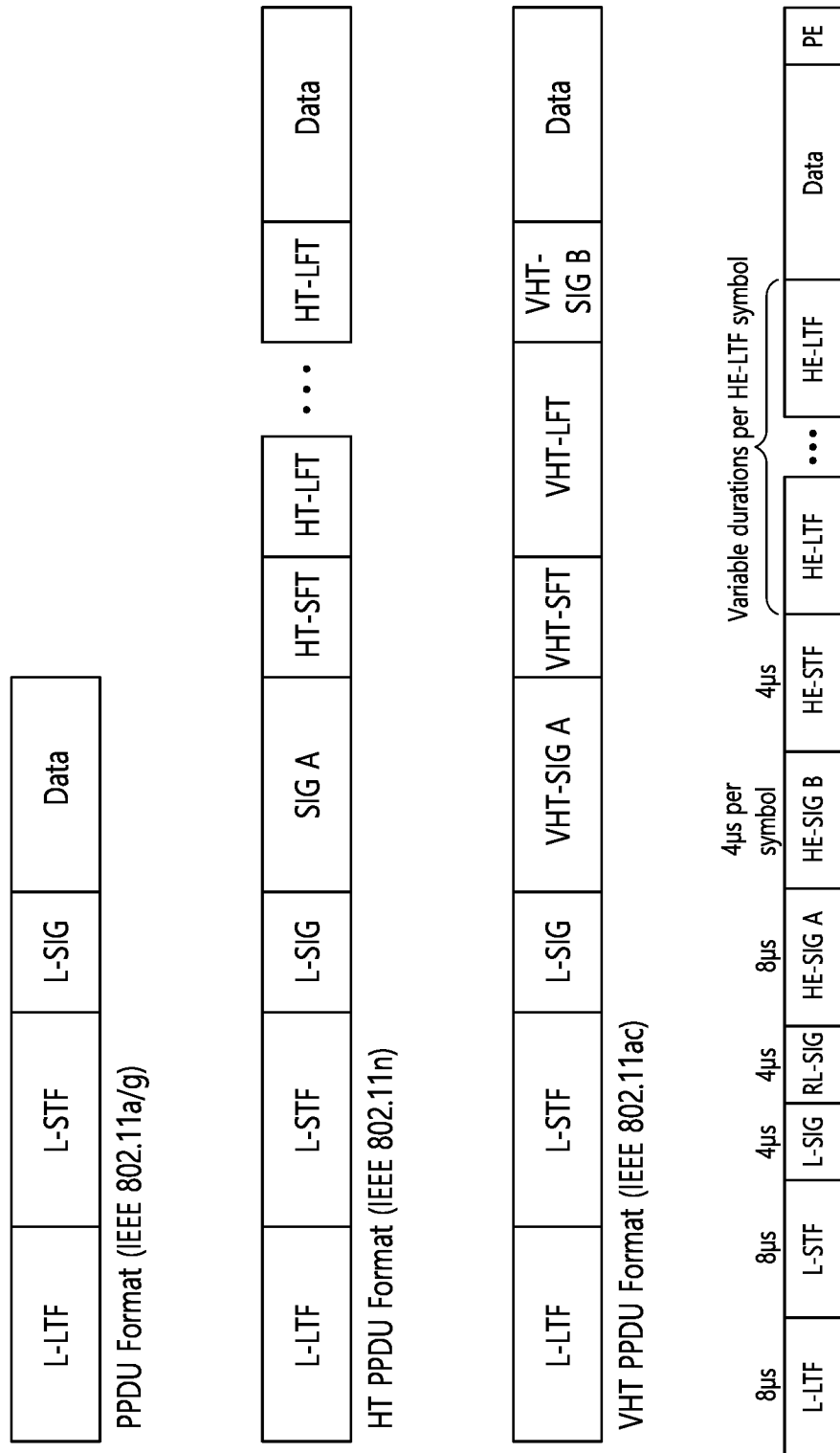
FIG. 4 illustrates an example of a PPDU used in an IEEE standard.

FIG. 4 illustrates an example of a PPDU used in an IEEE standard.

As illustrated in FIG. 4, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, a MAC payload), and a packet extension (PE) field. The respective fields may be transmitted for illustrated time periods (i.e., 4 or 8 µs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
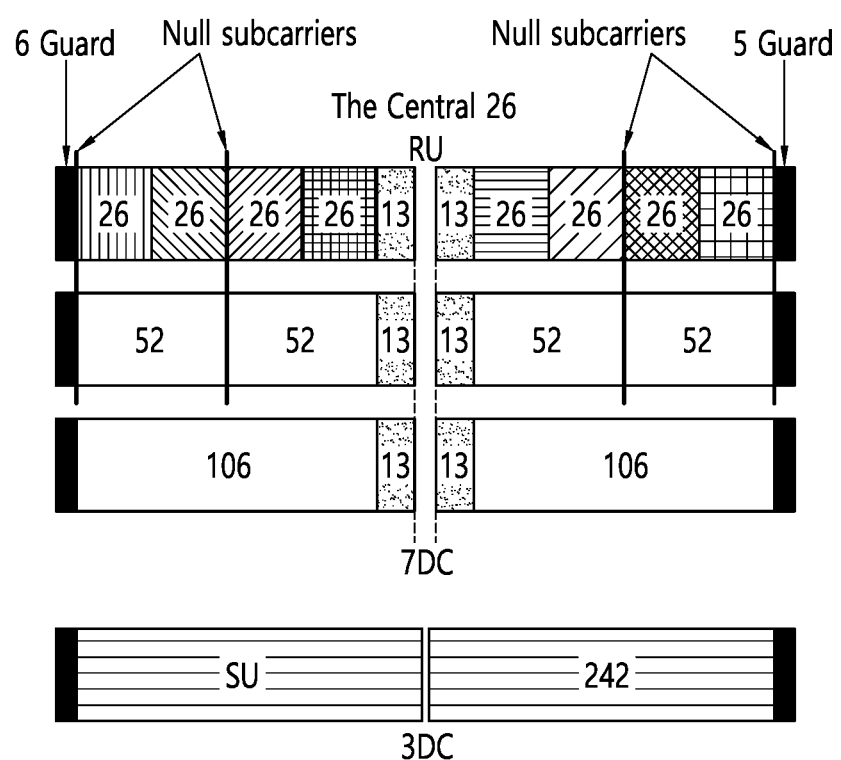
FIG. 5 illustrates a layout of resource units (RUs) used in a band of 20 MHz.

FIG. 5 illustrates a layout of resource units (RUs) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
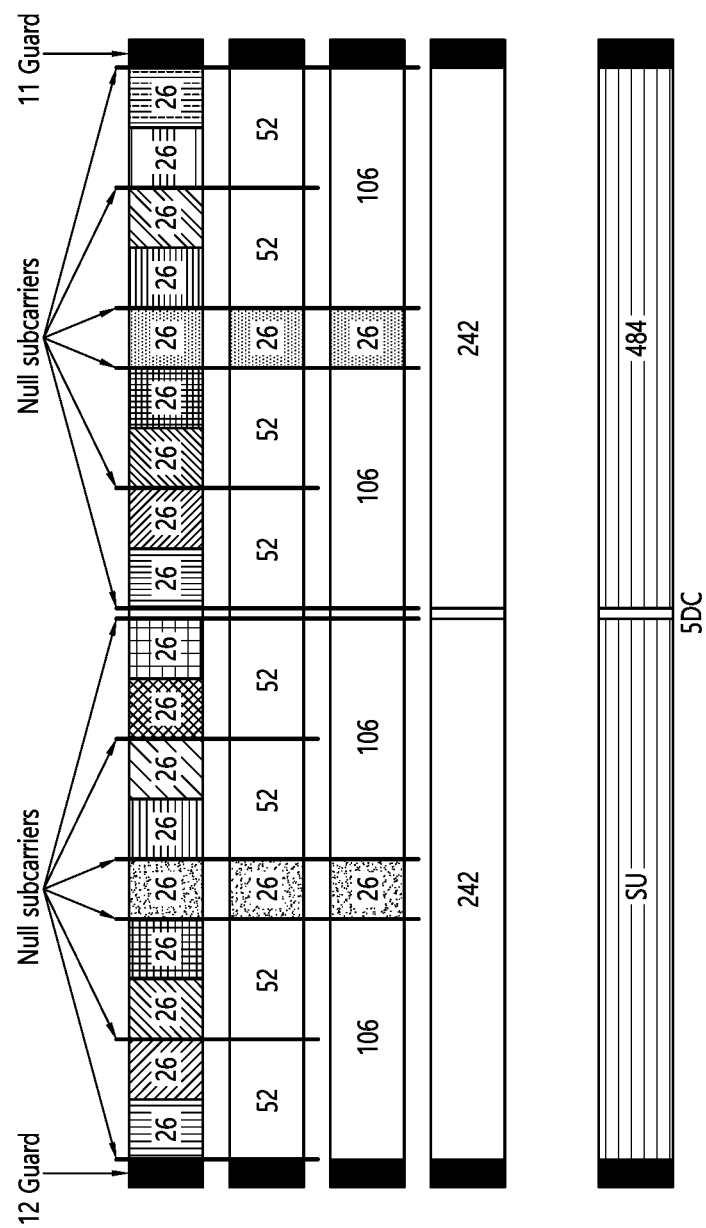
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
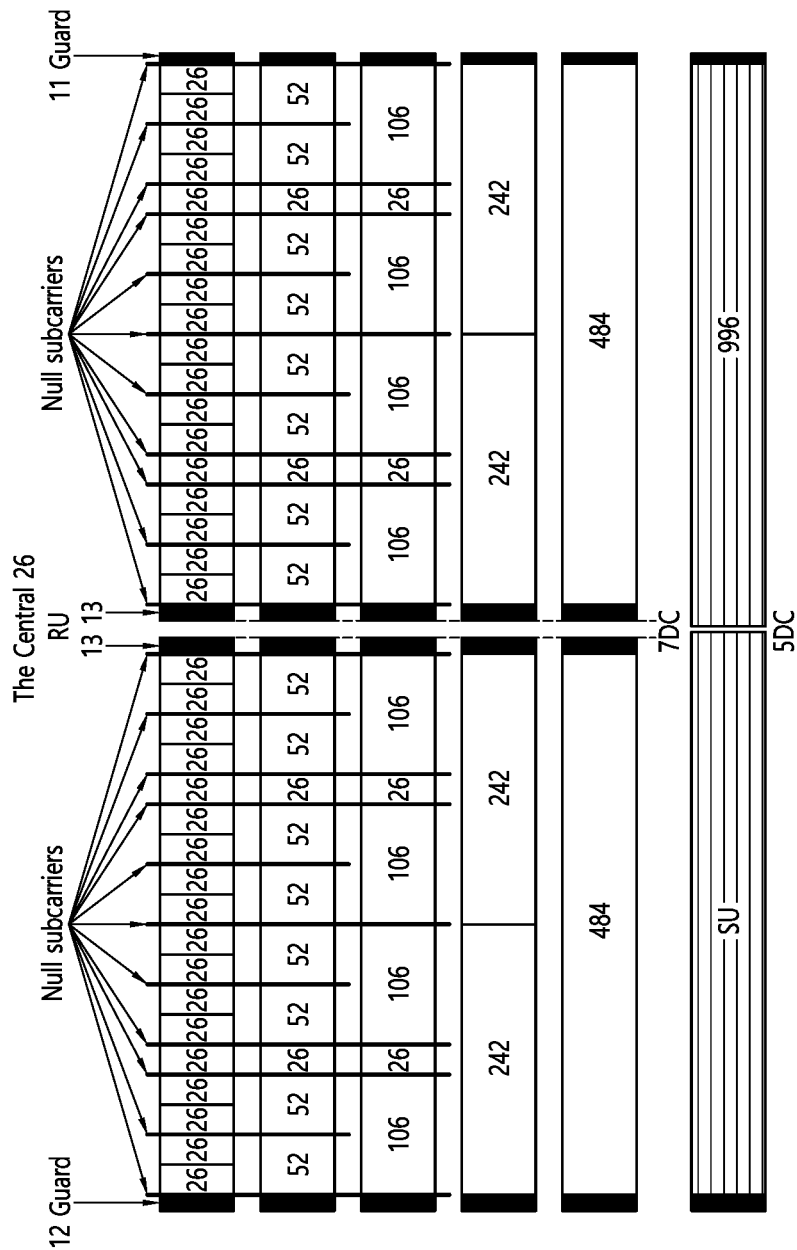
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
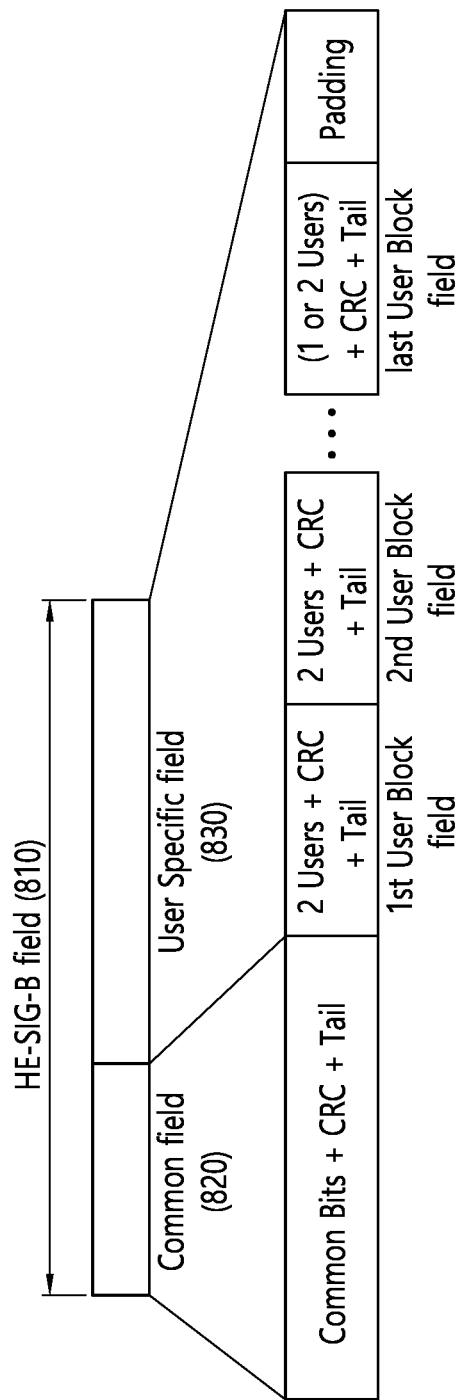
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N*8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| 8 bits indices (B7 B6 B5 B4 B3 B2 B1 B0) | #1 | #2 | #3 | 4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 |    | 1 |
| 00000010 | 26 | 26 | 26 | 26 | 26 | 52 | 26 | 26 |    | 1 |
| 00000011 | 26 | 26 | 26 | 26 | 26 | 52 | 52 |    |    | 1 |
| 00000100 | 26 | 26 | 52 | 26 | 26 | 26 | 26 |    |    | 1 |
| 00000101 | 26 | 26 | 52 | 26 | 26 | 26 | 52 |    |    | 1 |
| 00000110 | 26 | 26 | 52 | 26 | 52 | 26 | 26 |    |    | 1 |
| 00000111 | 26 | 26 | 52 | 26 | 52 | 52 |    |    |    | 1 |
| 00001000 | 52 | 26 | 26 | 26 | 26 | 26 | 26 | 26 |    | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ |  |  | 106 |  | 26 | 26 | 26 | 26 | 26 | 8 |
| 01001$y_2y_1y_0$ |  |  | 106 |  | 26 | 26 | 26 | 52 |    | 8 |

"01000$y_2y_1y_0$" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information ($y_2y_1y_0$). For example, when the 3-bit information ($y_2y_1y_0$) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000$y_2y_1y_0$", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
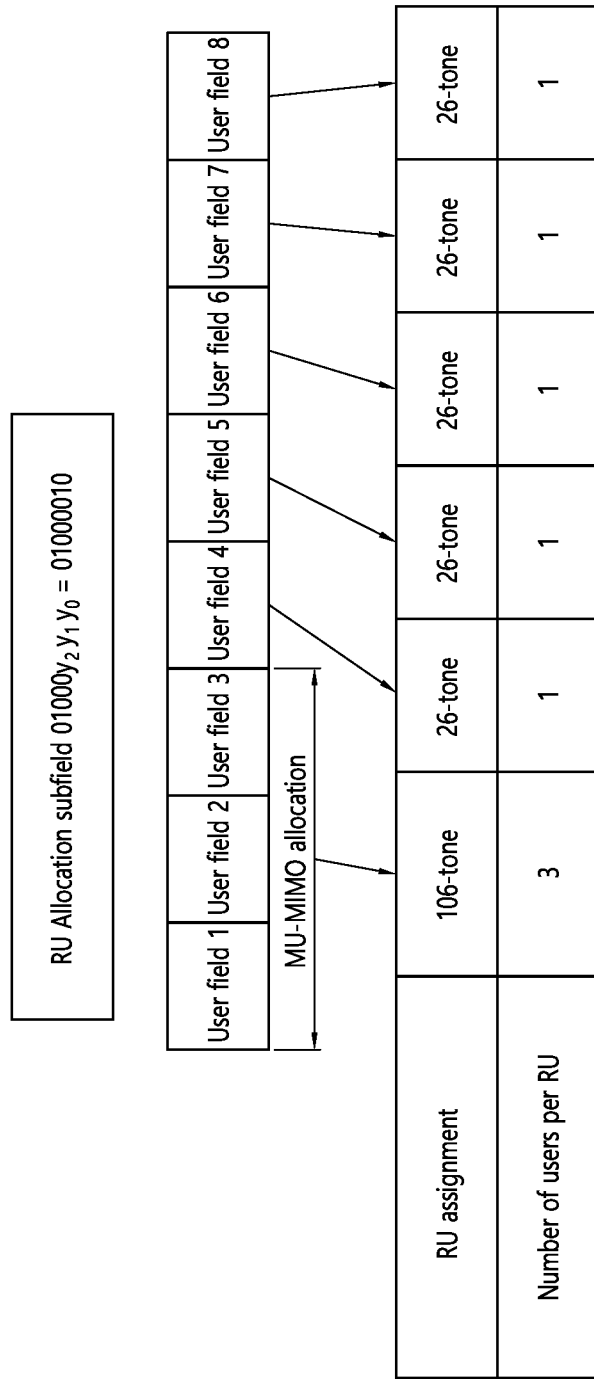
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field. The user fields shown in FIG. 8 and FIG. 9 may be configured based on two formats.

That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., ½, ⅔, ¾, ⅚e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Hereinafter, a PPDU transmitted/received in a STA of the present specification will be described.

Figure 10:
FIG. 10 illustrates an example of a PPDU used in the present specification.

FIG. 10 illustrates an example of a PPDU used in the present specification.

The PPDU of FIG. 10 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 10 may indicate the entirety or part of a PPDU type used in the EHT system. For example, the example of FIG. 10 may be used for both of a single-user (SU) mode and a multi-user (MU) mode. In other words, the PPDU of FIG. 10 may be a PPDU for one receiving STA or a plurality of receiving STAs. When the PPDU of FIG. 10 is used for a trigger-based (TB) mode, the EHT-SIG of FIG. 10 may be omitted. In other words, a STA which has received a trigger frame for uplink-MU (UL-MU) may transmit the PPDU in which the EHT-SIG is omitted in the example of FIG. 10.

In FIG. 10, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 10 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 10, the L-LTE and the L-STF may be the same as those in the conventional fields.

The L-SIG field of FIG. 10 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 10. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=½ to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be classified into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may inform that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is classified into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

Preamble puncturing may be applied to the PPDU of FIG. 10. The preamble puncturing implies that puncturing is applied to part (e.g., a secondary 20 MHz band) of the full band. For example, when an 80 MHz PPDU is transmitted, a STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 10 may include control information for the receiving STA. The EHT-SIG may be transmitted through at least one symbol, and one symbol may have a length of 4 us. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

A mode in which the common field of the EHT-SIG is omitted may be supported. The mode in which the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of contiguous tones, and a second modulation scheme may be applied to the remaining half of the contiguous tones. That is, a transmitting STA may use the first modulation scheme to modulate specific control information through a first symbol and allocate it to half of the contiguous tones, and may use the second modulation scheme to modulate the same control information by using a second symbol and allocate it to the remaining half of the contiguous tones. As described above, information (e.g., a 1-bit field) regarding whether the DCM scheme is applied to the EHT-SIG may be included in the U-SIG. An HE-STF of FIG. 10 may be used for improving automatic gain control estimation in a multiple input multiple output (MIMO) environment or an OFDMA environment. An HE-LTF of FIG. 10 may be used for estimating a channel in the MIMO environment or the OFDMA environment.

Information related to a type of STF and/or LTF (information related to a GI applied to LTF is also included) may be included in a SIG-A field and/or SIG-B field or the like of FIG. 10.

A PPDU (e.g., EHT-PPDU) of FIG. 10 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in DC signal(s). That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 10 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol; 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 10. In other words, the receiving STA may determine the RX PPDU as the EHT PPDU, based on: 1) a first symbol after an L-LTF signal, which is a BPSK symbol; 2) RL-SIG contiguous to the L-SIG field and identical to L-SIG; 3) L-SIG including a length field in which a result of applying "modulo 3" is set to "0"; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol; 2) when RL-SIG in which the L-SIG is repeated is detected; and 3) when a result of applying "modulo 3" to a value of a length field of the L-SIG is detected as "1" or "2".

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying "modulo 3" to the length value of the L-SIG is detected as "0", the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 10. The PPDU of FIG. 10 may be used to transmit/receive frames of various types. For example, the PPDU of FIG. 10 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 10 may be used for a management frame. An example of the management frame may include a beacon frame, a (re-)association request frame, a (re-)association response frame, a probe request frame, and a probe response frame. For example, the PPDU of FIG. 10 may be used for a data frame. For example, the PPDU of FIG. 10 may be used to simultaneously transmit at least two or more of the control frame, the management frame, and the data frame.

Figure 11:
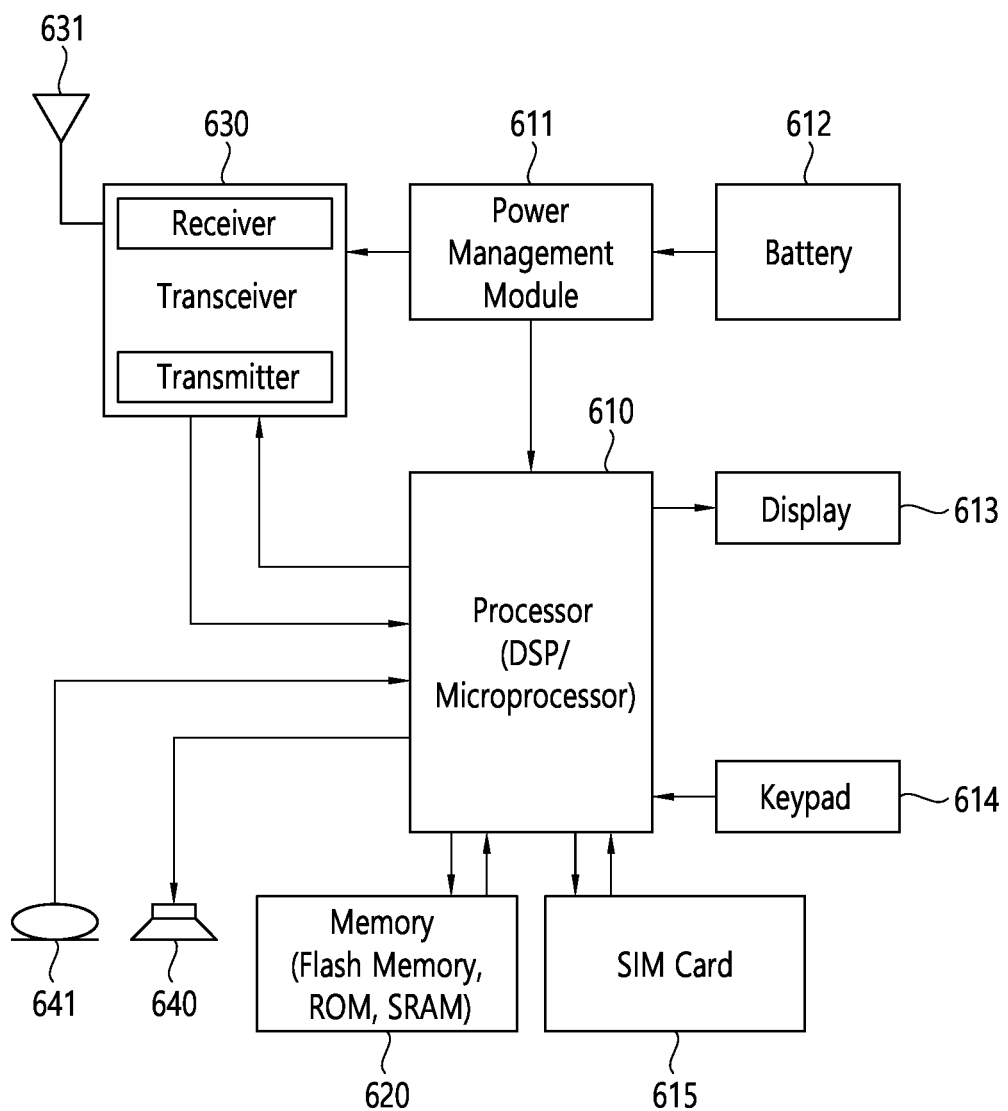
FIG. 11 illustrates an example of a modified transmission device and/or receiving device of the present specification.

FIG. 11 illustrates an example of a modified transmission device and/or receiving device of the present specification.

Each device/STA of the sub-figure (a)/(b) of FIG. 1 may be modified as shown in FIG. 11. A transceiver 630 of FIG. 11 may be identical to the transceivers 113 and 123 of FIG. 1. The transceiver 630 of FIG. 11 may include a receiver and a transmitter.

A processor 610 of FIG. 11 may be identical to the processors 111 and 121 of FIG. 1. Alternatively, the processor 610 of FIG. 11 may be identical to the processing chips 114 and 124 of FIG. 1.

A memory 620 of FIG. 11 may be identical to the memories 112 and 122 of FIG. 1. Alternatively, the memory 620 of FIG. 11 may be a separate external memory different from the memories 112 and 122 of FIG. 1.

Referring to FIG. 11, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 11, a speaker 640 may output a result related to a sound processed by the processor 610. A microphone 641 may receive an input related to a sound to be used by the processor 610.

Figure 12:
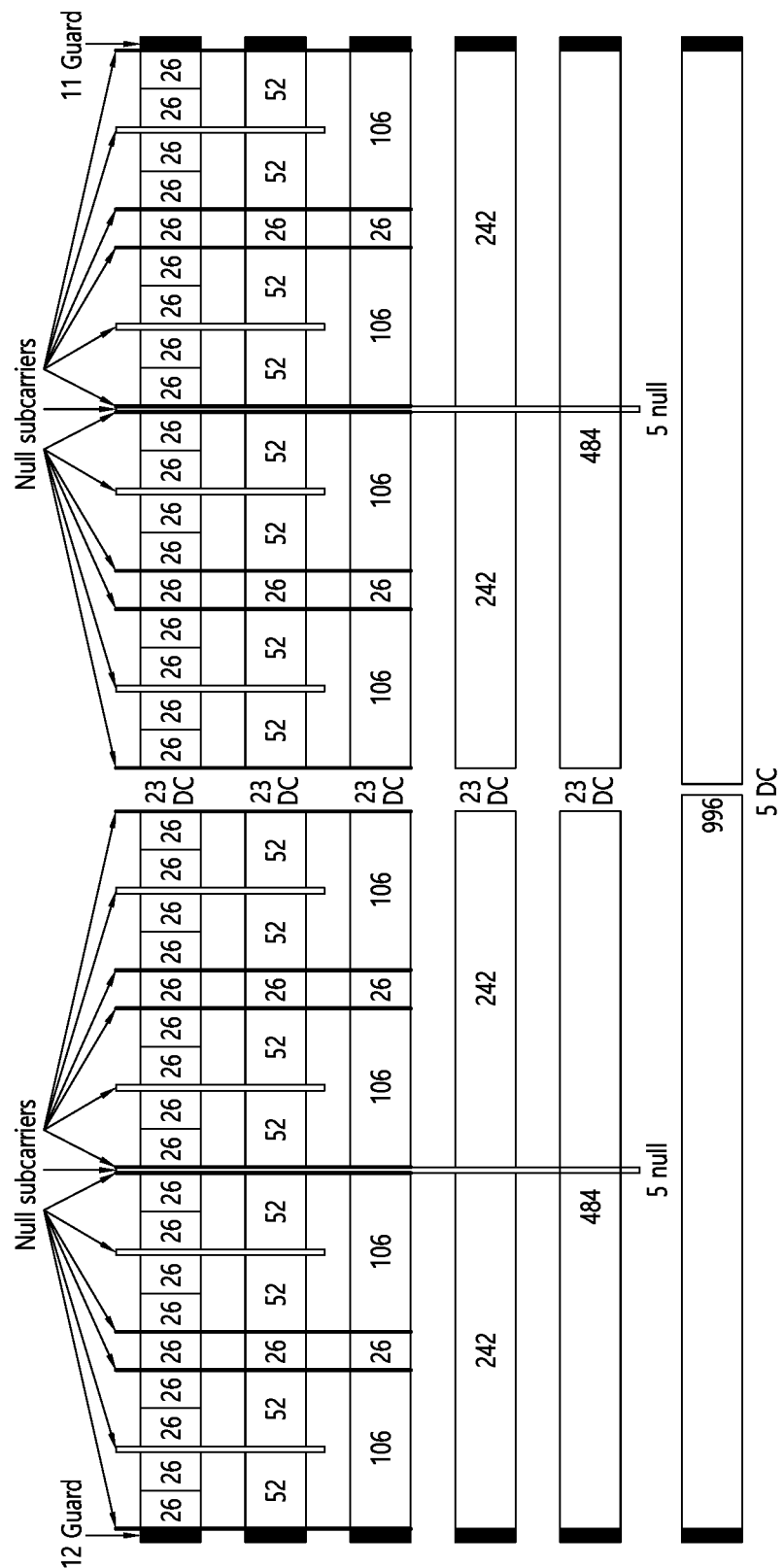
FIG. 12 is a diagram illustrating an arrangement of resource units (RU) used on an 80 MHz band.

FIG. 12 is a diagram illustrating an arrangement of resource units (RU) used on an 80 MHz band.

The arrangement of resource units (RU) used in the present specification may be variously changed. For example, the arrangement of resource units (RU) used on the 80 MHz band may be variously changed. For example, the arrangement of resource units (RU) used on the 80 MHz band may be configured based on FIG. 12 instead of FIG. 7.

The tone-plan for 160/240/320 MHz may be configured by repeating the pattern of FIG. 12 several times.

Figure 13:
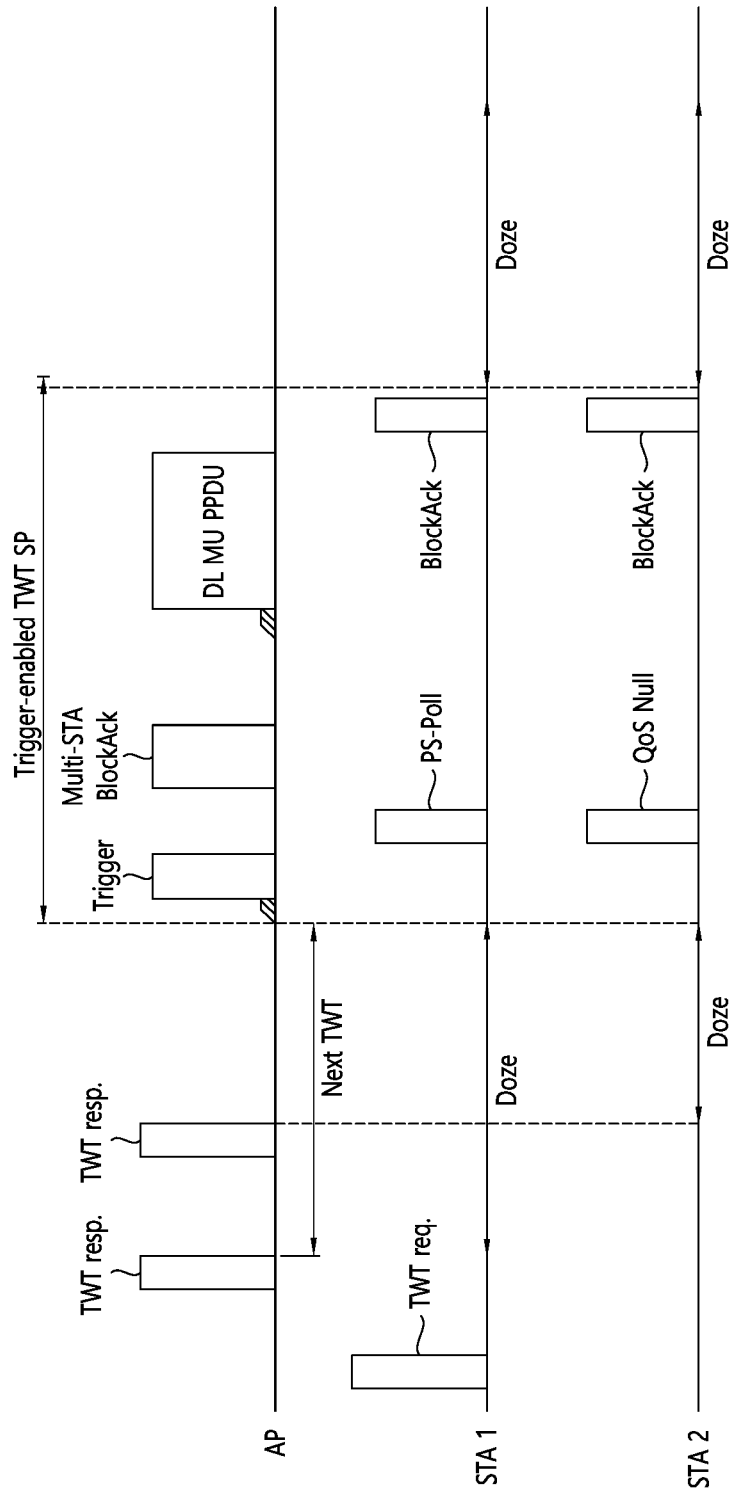
FIG. 13 illustrates an example of an individual TWT operation.
Figure 14:
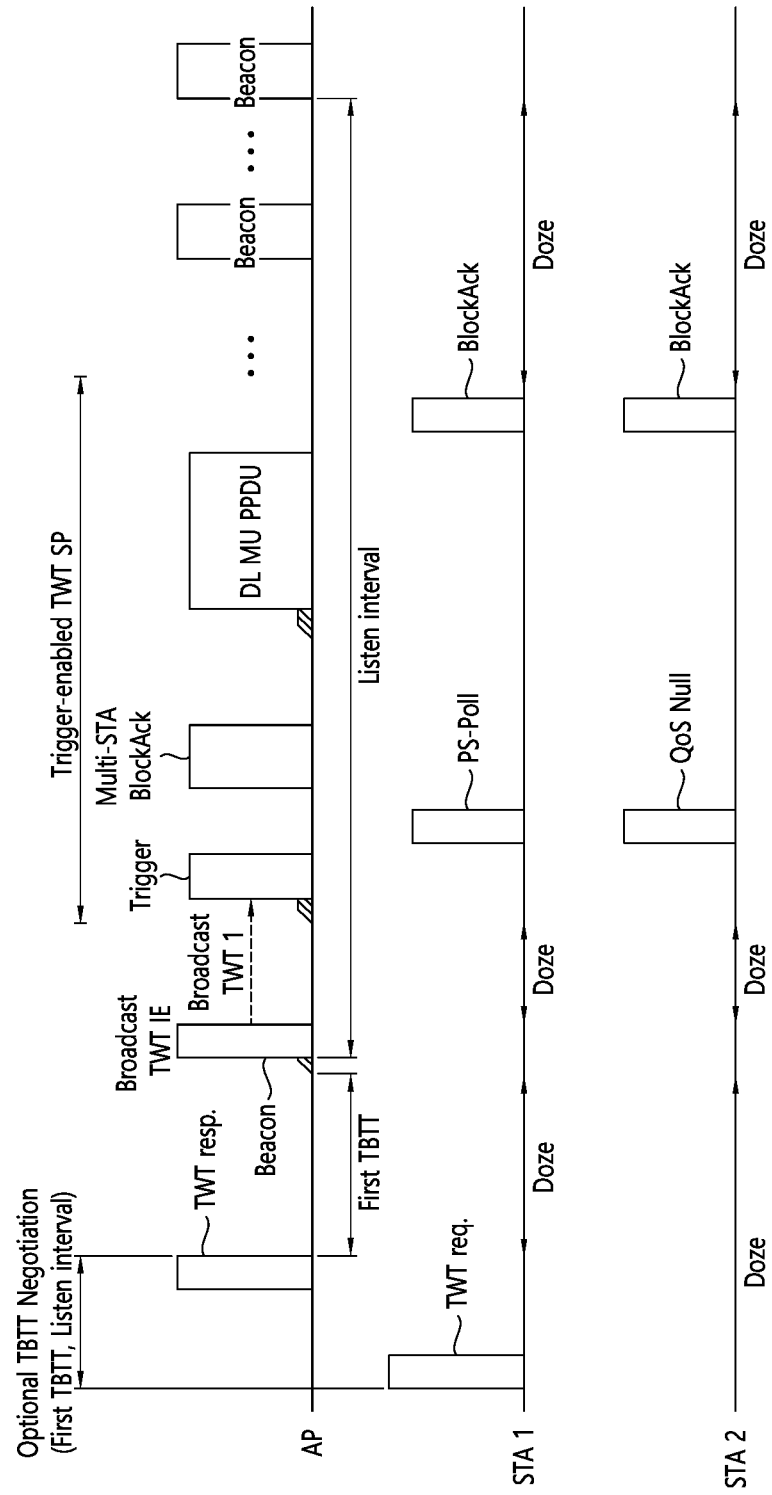
FIG. 14 illustrates an example of broadcast TWT operation.

Target Wake Time (TWT) is described below with reference to FIGS. 13 and 14. FIG. 13 illustrates an example of an individual TWT operation. FIG. 14 illustrates an example of broadcast TWT operation.

The TWT is a power saving (PS) technology in 11ax that can improve the energy efficiency of non-AP STAs by defining a Service Period (SP) between APs and non-AP STAs and sharing information about the SP with each other to reduce contention in the medium. A STA that performs a Request/Suggest/Demand in the TWT Setup phase can be called a TWT Requesting STA. In addition, the AP that responds to the request, such as Accept/Reject, can be called a TWT Responding STA. The Setup phase may involve determining/defining the TWT requests to the APs in the STA, the types of TWT operations to be performed, and the types of frames to be transmitted and received. TWT operations can be categorized into individual TWT and broadcast TWT.

The individual TWT is a mechanism by which an AP and non-AP STA negotiate the awake/dozes status of the non-AP STA through the transmission and reception of TWT Request/Response frames, and then perform data exchange. FIG. 13 illustrates an example of the behavior/operation of the individual TWT. The AP and STA 1 may configure a trigger-enabled TWT agreement through a TWT request frame and a TWT response frame. In this case, the method utilized by STA 1 is the Solicited TWT method, in which the STA 1 transmits a TWT request frame to the AP, and STA 1 receives information for TWT operation from the AP in a TWT response frame. On the other hand, STA 2 performing the unsolicited TWT method may receive information about the trigger-enabled TWT agreement setting from the AP via an unsolicited TWT response. Specifically, the STA 2 may calculate the next TWT by adding a specific number from the current TWT value. During a trigger-enabled TWT SP, the AP may transmit a trigger frame to the STAs. The trigger frame may inform the AP that it has buffered data. In response, STA 1 may transmit a PS-Poll frame to inform the AP of its awake state. STA 2 may also inform the AP of its awake state by transmitting a QoS Null frame. In this case, the data frames transmitted by STA 1 and STA 2 can be TB PPDU format frames. After verifying the status of STA 1 and STA 2, the AP may transmit DL MU PPDUs to the activated STAs. When the corresponding TWT SP expires, STA 1 and STA 2 may enter the doze state.

The broadcast TWT is a TWT in which the non-AP STA (TWT Scheduling STA) obtains information about the Target Beacon Transmission Time (TBTT) and Listen Interval by transmitting and receiving TWT request/response frames with the AP (TWT Scheduled STA). At this time, a negotiation operation for TBTT may be performed. Based on this, the AP may define a frame to include the scheduling information of the TWT via a Beacon frame. In FIG. 14, STA 1 performs the Request TWT operation and STA 2 performs the Non-Request TWT operation. After the AP determines that the STAs are awake from the trigger it transmitted, it can transmit a DL MU PPDU. This can be the same as the process of an individual TWT. On the other hand, in a broadcast TWT, the trigger-enabled TWT SP, including the beacon frame, may be repeated multiple times at regular intervals.

In one example, a time delay herein may refer to a delay/latency as defined in IEEE 802.11ax, i.e., the time from when a frame enters the queue at the MAC layer of the transmitting STA, until the transmission of the transmitting STA at the PHY layer ends successfully, and the transmitting STA receives an ACK/block ACK, etc. from the receiving STA and the frame is deleted from the queue at the MAC layer of the transmitting STA. Also, in this specification, a non-AP STA that supports the transmission of latency sensitive data may be referred to as a low latency STA. A non-AP that supports the transmission of non-latency sensitive data, i.e., regular data, may be referred to as a regular STA.

In this specification, latency-sensitive data may be data included in a predefined access category (AC). Further, in this specification, the latency-sensitive data may be data assigned a predefined traffic identifier (TID). Further, in the present disclosure, the low latency STA may be a STA that supports restricted TWT operation. Also, in this specification, a regular STA may be a station that supports restricted TWT operation, a station that does not support restricted TWT operation, or a station that performs transmissions during a restricted TWT SP of another STA.

The restricted TWT operation is described below.

The restricted TWT is a technique in which a low-latency STA transmitting latency-sensitive data uses broadcast TWT to prioritize the transmission time of that data. The low-latency STA supports restricted TWT of the broadcast TWT and can inform the AP that it should transmit data based on the restricted TWT. If the AP supports the restricted TWT, the AP can transmit a beacon frame to the low-latency STA and the regular STA containing the scheduling information of the TWTs requested by each STA. In addition, according to the restricted TWT technology, a separate/different TXOP may proceed within the restricted TWT SP using NAV protection techniques such as (MU) RTS/CTS or CTS-to-self. In this case, if a TXOP of another STA proceeds before the protected TWT SP of the low-latency STA (e.g., the restricted TWT SP established for the low-latency STA) starts, the TXOP may be suspended. The TXOP may further proceed after the end of the protected TWT SP of the low-latency STA.

The reception of beacon frames by non-AP STAs serves an important role in the performance of TWT operations. In broadcast TWT operation, the AP transmits a beacon frame containing the TWT scheduling information of each STA/terminal, and each non-AP STA can perform TWT operation based on the beacon frame. Scheduling information for restricted TWT of low-latency STAs may also be included in the beacon frame transmitted by the AP. However, if a non-AP STA does not receive a beacon frame from the AP, the non-AP STA may not obtain information about TWT scheduling.

Figure 15:
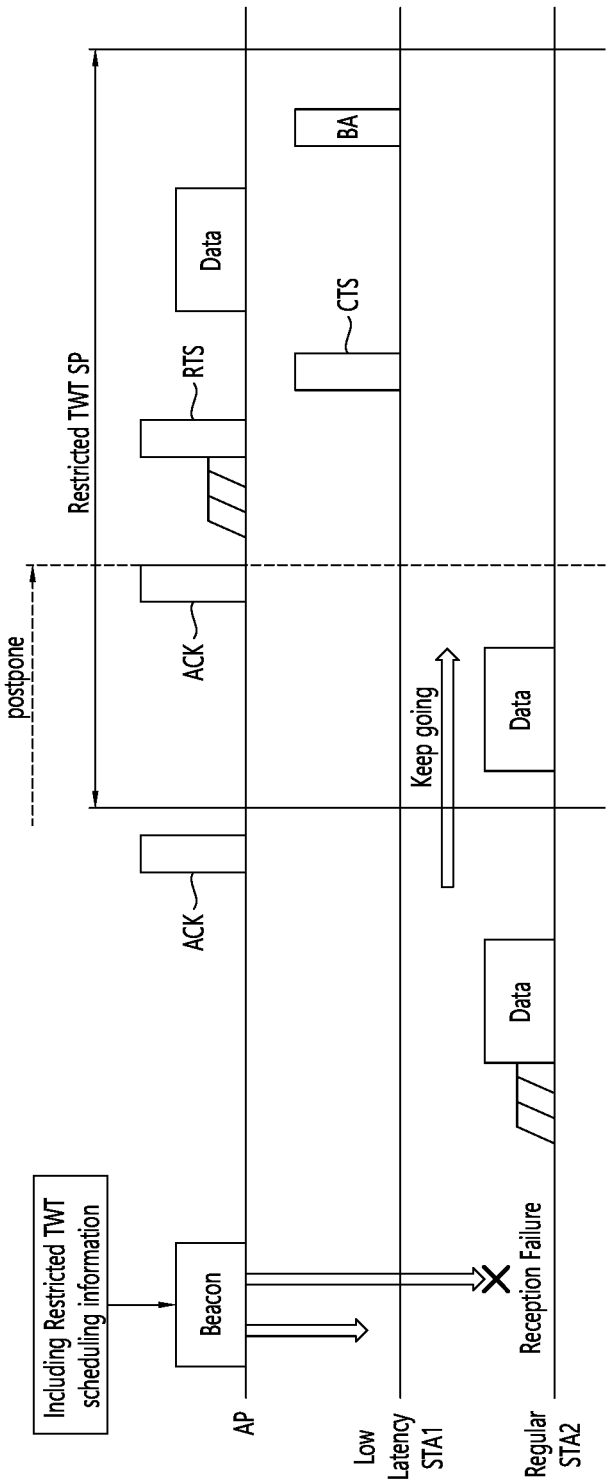
FIG. 15 illustrates an example of when a STA does not receive scheduling information for a restricted TWT.

FIG. 15 illustrates an example of a STA failing to receive scheduling information for a restricted TWT. Referring to FIG. 15, an AP transmits a beacon frame including scheduling information for a restricted TWT, and a regular STA fails to receive the beacon frame. The reception failure may be caused by external environmental factors or internal transient errors (e.g., power saving mode (doze state), channel interference, etc.). In this case, a regular STA that has advertised scheduling for a restricted TWT by an AP but has not received that information may behave/operate as shown in FIG. 15. The regular STA may complete the data transmission without terminating its transmission opportunity (TXOP) regardless of the existence/setting of the restricted TWT, i.e., the regular STA may continue and complete the data transmission until its TXOP expires. According to the existing specification, the low-latency STA in FIG. 15 waits until the regular STA expires its TXOP to free the channel.

In other words, referring to FIG. 15, the AP transmits a beacon frame. Here, the beacon frame may include restricted TWT scheduling information. The restricted TWT scheduling information may include scheduling information for restricted TWT operation of the low-latency STA 1. Although not shown in FIG. 15, the signal may be configured in a format other than a beacon frame format.

In this case, the low-latency STA1 may receive the beacon frame while the regular STA2 may not receive the beacon frame due to external environmental factors, internal transient errors, etc. The regular STA2 may obtain a TXOP based on a backoff operation, and then transmit data within the TXOP.

The regular STA2 may terminate its TXOP before the start of the restricted TWT service period (SP). Furthermore, the regular STA2 may resume the transmission of data after the end of the restricted TWT SP. In this case, the resumption of data transmission may be performed within the TXOP which is obtained based on an additional backoff behavior/procedure. Alternatively, the transmission of the data may be resumed within the TXOP based on the fact that a TXOP that was terminated prior to the start of the restricted TWT SP is resumed after the end of the restricted TWT SP.

However, referring to FIG. 15, it may occur that the regular STA2 does not receive the beacon frame, i.e., does not obtain the restricted TWT SP scheduling information, and therefore continues to transmit the data without terminating its TXOP even after the start point of the restricted TWT SP has elapsed. In this case, the low-latency STA1 may not be able to perform transmit/receive operations within the restricted TWT SP assigned to it. Furthermore, in this case, the start of the restricted TWT SP may be postponed/delayed to the end of the data transmission operation of the regular STA2 and/or the ACK transmission operation of the AP.

Figure 16:
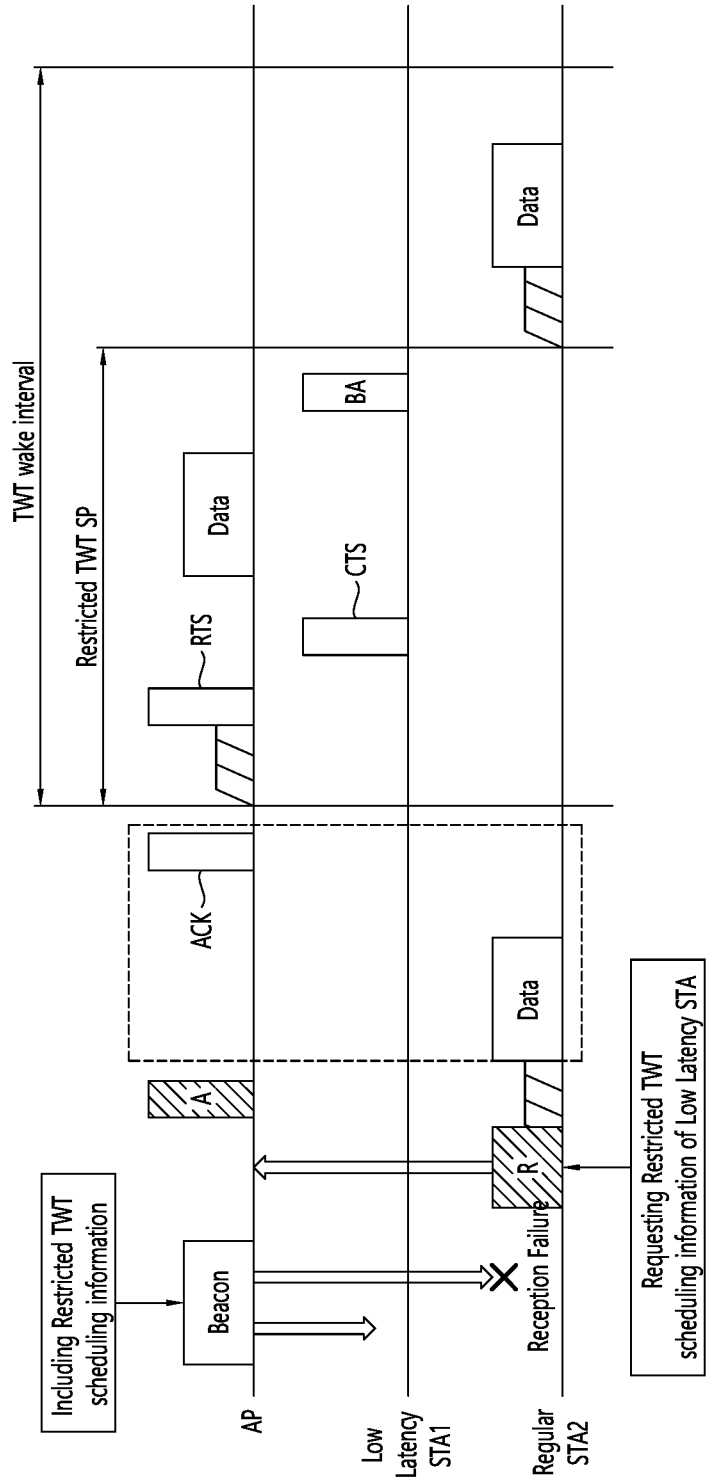
FIG. 16 illustrates an example of a request method for scheduling information for a restricted TWT performed by an STA.
Figure 17:
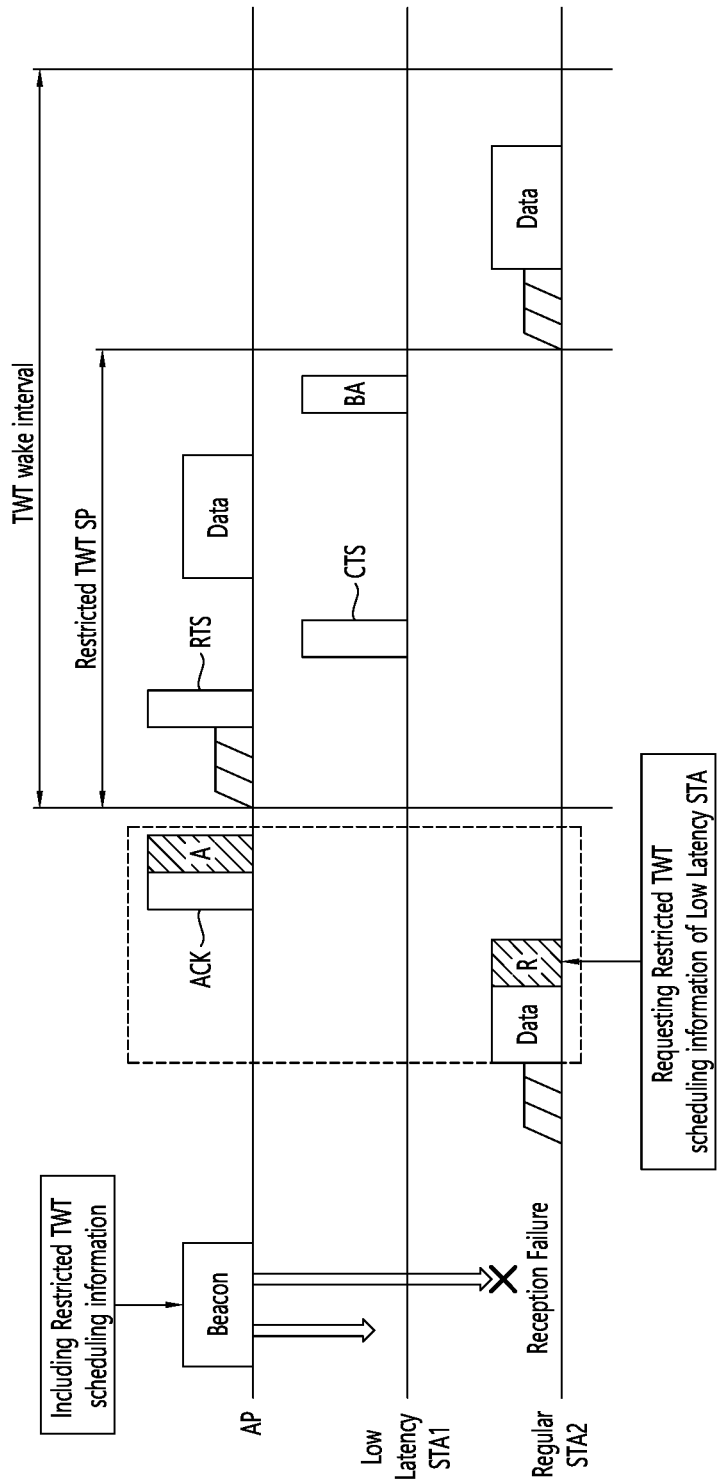
FIG. 17 illustrates another example of a method of requesting restricted TWT scheduling information performed by an STA.

FIG. 16 illustrates an example of a request method for restricted TWT scheduling information performed by an STA. FIG. 17 illustrates another example of a method of requesting restricted TWT scheduling information performed by an STA. While FIGS. 16 and 17 illustrate a case where a regular STA does not receive a beacon frame, the examples of FIGS. 16 and 17 may also apply to a case where a low-latency STA does not receive a beacon frame.

As shown in the examples of FIGS. 16 and 17, the (regular) STA may perform the requested behavior/operation when it does not receive the restricted TWT scheduling information shared by the beacon frame from the AP.

Referring to FIG. 16, the AP transmits a beacon frame. Here, the beacon frame may include restricted TWT scheduling information. The restricted TWT scheduling information may include scheduling information for the restricted TWT operation of the low-latency STA1.

In this case, the low-latency STA1 may receive the beacon frame, while the regular STA2 may not receive the beacon frame due to external environmental factors, internal transient errors, etc. The regular STA2 may obtain a transmission opportunity (TXOP) based on a backoff operation, and then transmit data within the TXOP. Since the regular STA2 has not received the beacon frame, i.e., has not obtained the restricted TWT SP scheduling information, it may occur that the regular STA2 does not terminate its TXOP and continues to transmit the data after the start point of the restricted TWT SP has elapsed.

Referring now to FIG. 16, the regular STA2 may transmit request information to the AP. The request information may be information requesting restricted TWT schedule information from a low-latency STA. Upon receiving the request information, the AP may transmit a response frame to the request information. The response frame may include information about the scheduled restricted TWT SP. For example, the response frame may include information about a restricted TWT SP set for the low latency STA1. Upon receipt of the response frame, a regular STA2 may terminate its TXOP prior to the start time of the restricted TWT SP established for the low latency STA1.

In other words, FIG. 16 illustrates how a (regular) STA transmits a separate discovery request to an AP. Before starting its TXOP, the STA may transmit the discovery request information to the AP about the existence of an SP of a restricted TWT scheduled to be performed in the near future. If the SP exists, the discovery request information may include a request for specific scheduling information of the restricted TWT.

Referring to FIG. 17, the AP transmits a beacon frame. Here, the beacon frame may include restricted TWT scheduling information. The restricted TWT scheduling information may include scheduling information for restricted TWT operation of the low-latency STA1. In this case, the low-latency STA1 may receive the beacon frame, while the regular STA2 may not receive the beacon frame due to external environmental factors, internal transient errors, etc. The regular STA2 may obtain a transmission opportunity (TXOP) based on a backoff operation, and then transmit data within the TXOP. Since the regular STA2 has not received the beacon frame, i.e., has not obtained the restricted TWT SP scheduling information, it may occur that the regular STA2 does not terminate its TXOP and continues to transmit the data after the start point of the restricted TWT SP has elapsed.

Here, referring to FIG. 17, the regular STA2 may include request information in its data and transmit it to the AP together. The request information may be information requesting restricted TWT schedule information for low latency STAs. In response to the request information, the AP may transmit an ACK for the data and response information to the request information to the regular STA2. The response information may include information about restricted TWT SPs scheduled by the AP. Accordingly, the regular STA2 that has not received the beacon frame may terminate its TXOP prior to the start time of the restricted TWT SP, based on the information related to the restricted TWT SP contained in the response information.

In other words, FIG. 17 illustrates a method in which a regular STA transmits a message containing a discovery request to an AP. The STA may transmit data containing the discovery request information about the existence of an SP of a restricted TWT scheduled to be performed in the near future. If the SP exists, the discovery request information may include a request for specific scheduling information of the restricted TWT.

Thereby, the corresponding (regular) STA may obtain from the AP information about the existence of an SP and/or scheduling information for the restricted TWT scheduled to start. Based on the discovery results for the SP for the restricted TWT received from the AP, the (regular) STA may terminate its TXOP prior to the start of the SP for the restricted TWT.

This specification proposes a method for a (regular) STA to recognize that it has not received a beacon frame from an AP before requesting scheduling information for a restricted TWT of a low-latency STA from the AP.

When a (regular) STA has not received a beacon frame after a period of time, the STA may recognize that it has failed to receive the beacon frame. In this case, the STA may perform one or more of the actions/operations described below.

For example, the STA may transmit a beacon frame at a certain time from the Target Beacon Transmission Time (TBTT) (e.g., Short Inter-Frame Space (SIFS), PCF Inter-Frame Space (PIFS), Arbitration Inter-Frame Space [Access Category] (AIFS [AC]), Extended Inter-Frame Space (EIFS), ¼ of the beacon interval, ½ of the beacon interval, and ¾ of the beacon interval) has elapsed and the STA has not received a beacon frame from the AP, the (regular) STA may transmit the AP a separate discovery request information for the restricted TWT SP.

Alternatively, if the STA does not receive a beacon frame from the AP after a certain amount of time (e.g., SIFS, PIFS, AIFS [AC], EIFS, ¼ of the beacon interval, ½ of the beacon interval, ¾ of the beacon interval) has elapsed from the TBTT, the (regular) STA may include discovery request information for the restricted TWT SP in the data transmitted by the STA to the AP.

In broadcast TWT, the AP may schedule beacon frames to be transmitted at periodic beacon intervals for future data transmission. The beacon interval may be the interval between two consecutive TBTTs. During the initial negotiation process for a broadcast TWT, APs and STAs may exchange information about TBTTs. This allows the AP to transmit beacon frames to its associated STAs for every TBTT. In response, when an EHT non-AP STA does not receive a beacon frame in the beacon interval, the STA may request information about the Restricted TWT SP and/or scheduling information for the Restricted TWT from the AP after a time period which is corresponding to an IFS period/duration/interval which is one of RIFS, SIFS, PIFS, DIFS, AIFS [AC], EIFS, or a portion (¼, ½, or ¾) of the beacon interval being defined in 802.11.

The EHT non-AP STA may receive prior advertisement from the AP and/or conduct prior negotiation with the AP regarding the time interval for determining non-receipt of beacon frames after TBTT. The prior advertisement and prior negotiation may be accomplished through one or more of the following methods.

Figure 18:
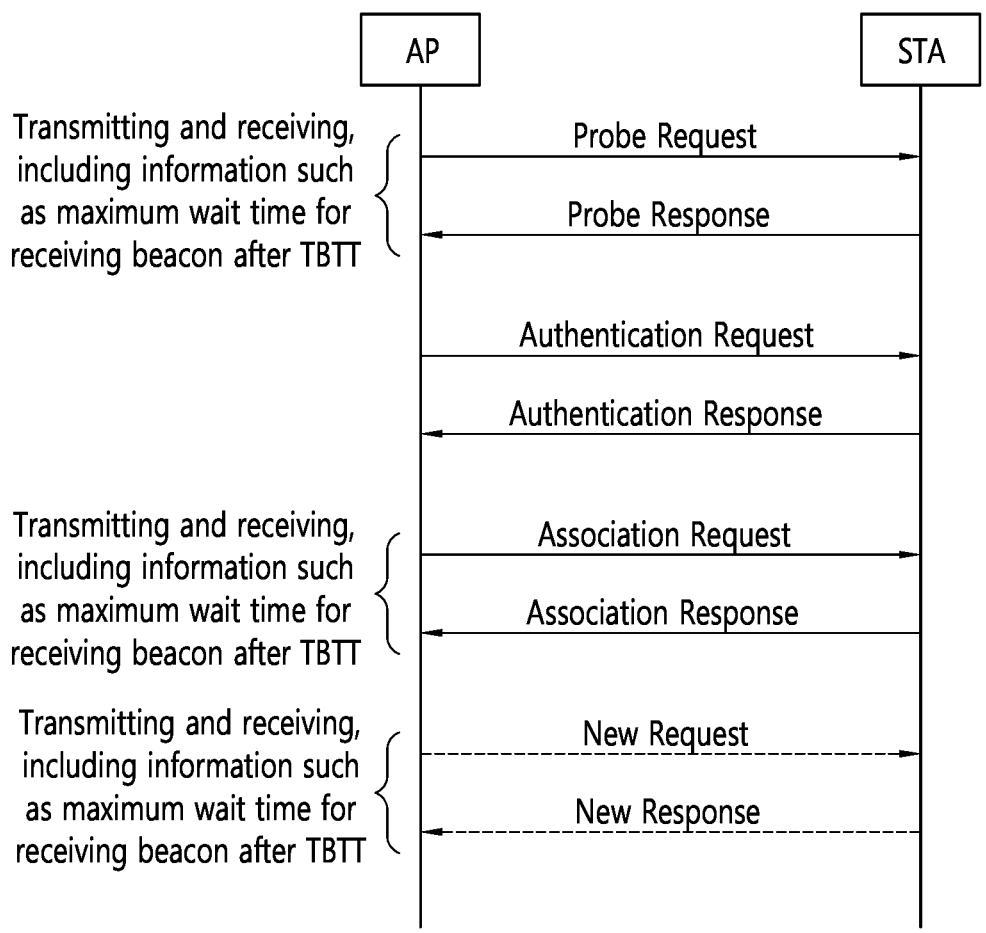
FIG. 18 illustrates an example of a negotiation process between a STA and an AP.

For example, through a negotiation process between the STA and the AP (e.g., Probe Request and Probe Response, Association Request and Association Response, New Request and New Response, etc.), the STA may pre-negotiate with the AP a maximum value of time to wait to receive beacon frames after TBTT. FIG. 18 illustrates an example of a negotiation procedure between a STA and an AP. Transmitting and receiving the information may be accomplished by one or more of the procedures described below.

Specifically, referring to FIG. 18, the AP may transmit probe request information to the STA, and the STA may transmit probe response information to the AP. Further, the AP may transmit authentication request information to the STA, and the STA may transmit authentication response information to the AP. Further, the AP may transmit association request information to the STA, and the STA may transmit association response information from the AP. Here, the AP and the STA may transmit and receive information, such as a maximum value of a reception latency of a beacon frame after TBTT, through a procedure for transmitting and receiving probe request information and probe response information and/or a procedure for transmitting and receiving association request information and association response information.

Furthermore, the STA may transmit and receive the relevant information through a separate new request and response process to negotiate the maximum value of the time that the STA can wait after the TBTT to receive the beacon frame, i.e., the AP may transmit a new request information to the STA requesting information such as the maximum value of the waiting time to receive the beacon frame after the TBTT, and the STA may transmit a new response information to the new request information from the AP.

Figure 19:
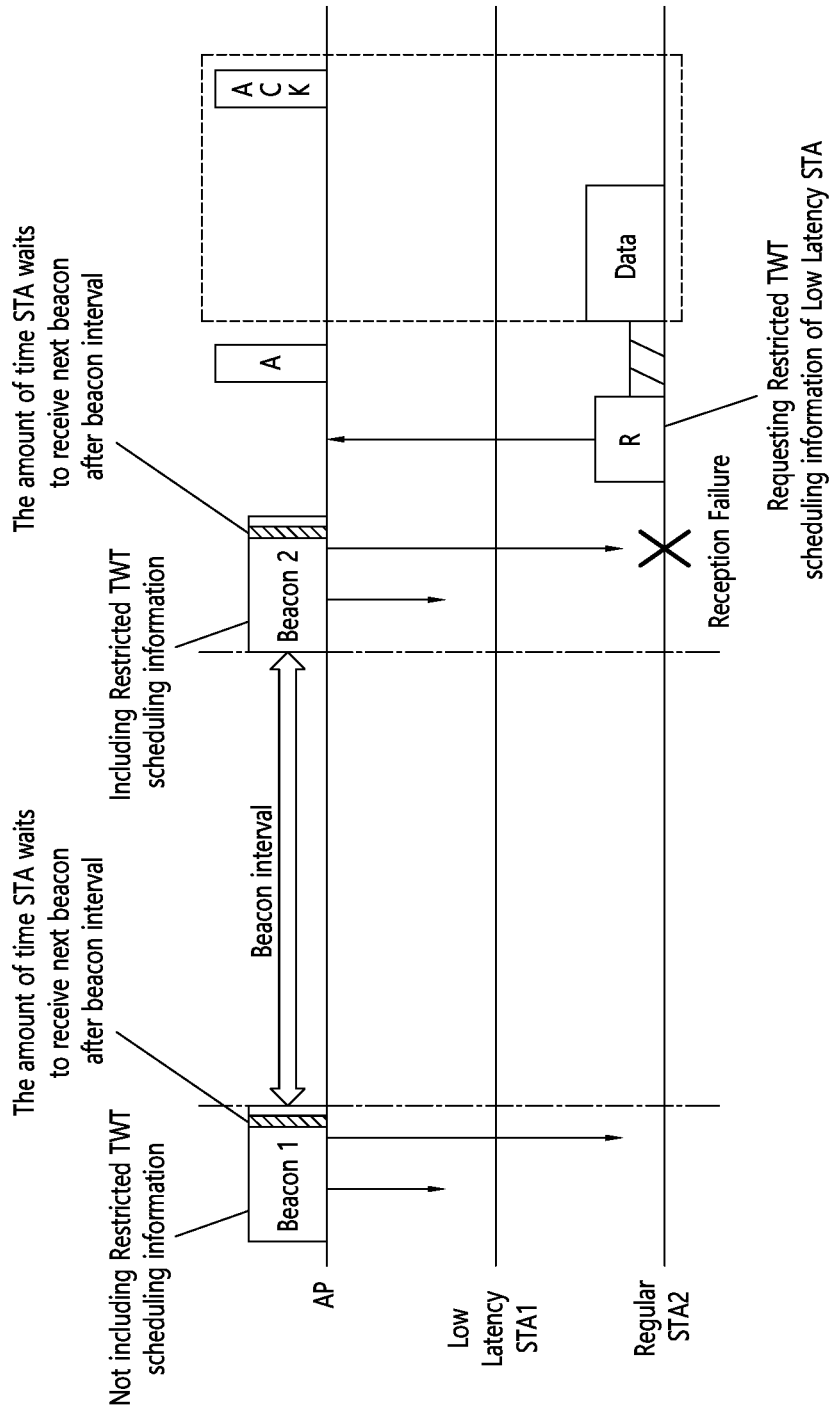
FIG. 19 is a drawing to illustrate information included in a beacon frame as proposed herein.

In another example, whenever an AP transmits a beacon frame to an EHT non-AP STA, the beacon frame may include information about a maximum time that the STA waits to receive the next beacon frame after TBTT (e.g., Next Beacon Waiting Time). FIG. 19 is a drawing to illustrate information included in a beacon frame as proposed herein.

Referring to FIG. 19, an AP may transmit a beacon frame 1 comprising information about a maximum time value that a STA should wait for reception of beacon frame 2 after a TBTT for beacon frame 2. Upon receipt of the beacon frame 1, the STA may wait for beacon frame 2 for the time specified in beacon frame 1 after the TBTT for beacon frame 2. If the STA has not received beacon frame 2 after waiting for the time specified in beacon frame 1, the STA may request information about the restricted TWT from the AP.

FIG. 19 illustrates a configuration in which beacon frame 1 does not include restricted TWT scheduling information and beacon frame 2 includes restricted TWT scheduling information. However, the technical features proposed herein are not limited to examples such as FIG. 19. Specifically, the example of FIG. 19 may be applicable in cases where beacon frame 1 includes restricted TWT scheduling information and/or where beacon frame 2 does not include restricted TWT scheduling information.

This specification proposes the behavior/operation of an EHT non-AP STA that supports terminating its TXOP to perform a restricted TWT operation advertised by an associated AP. The STA may wait to receive a beacon frame for a period of time from the TBTT if it has not received the specific beacon frame despite the beacon interval after the TBTT for the specific beacon frame. If the STA does not receive a beacon frame from the AP, the STA may request relevant information from the AP to obtain information about the scheduling of the restricted TWT.

Figure 20:
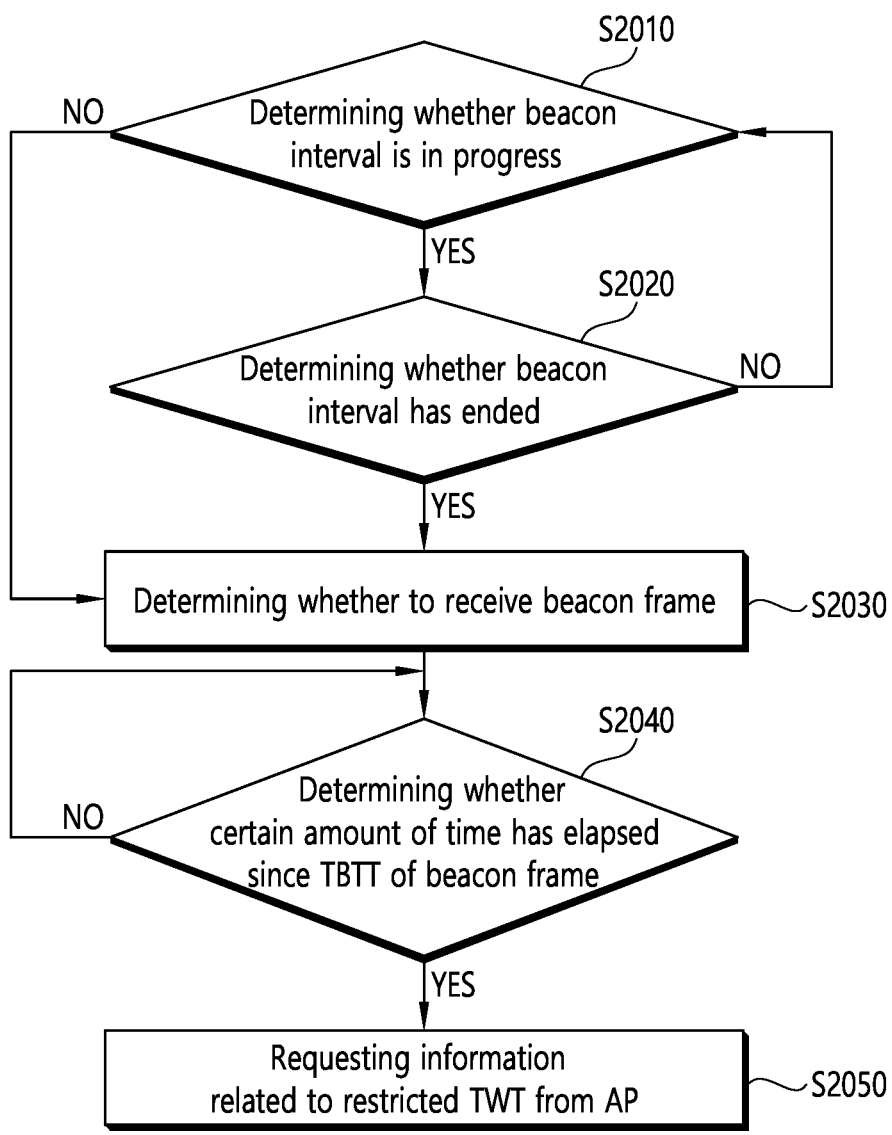
FIG. 20 is a flowchart for an example of an STA's behavior when the STA does not receive a beacon frame.

According to the method proposed herein, if the EHT non-AP STA does not receive the beacon frame, the STA may perform an operation as shown in FIG. 20 to obtain the information of the restricted TWT from the AP.

FIG. 20 is a flowchart of an example of an STA's behavior when the STA does not receive a beacon frame. The STA of FIG. 20 may include a regular STA and a low-latency STA.

Referring to FIG. 20, the STA determines whether the beacon interval is in progress (S2010). Here, the beacon interval may refer to a time interval between two consecutive TBTTs.

If the STA determines that the beacon interval is in progress, the STA determines whether the beacon interval has ended (S2020). Here, if the STA determines that the beacon interval has not ended, the STA again determines whether the beacon interval is in progress, i.e., if the STA determines that the beacon interval has not ended, it returns to step S2010.

If the STA determines that the beacon interval has ended, the STA determines whether to receive the beacon frame (S2030). Alternatively, if the STA determines in step S2010 that the beacon interval is not in progress, the STA determines whether to receive the beacon frame.

FIG. 20 illustrates an example of the behavior of the STA when the STA has not received the beacon frame, and does not consider the case where the STA has received the beacon frame at step S2030. In step S2030, if the STA has not received the beacon frame, the STA determines (S2040) whether a certain amount of time has elapsed since the TBTT of the beacon frame. Here, if the period of time has not elapsed, the STA returns to step 2040. Alternatively, if a certain amount of time has elapsed, the STA requests information related to the restricted TWT from the AP (S2050).

Figure 21:
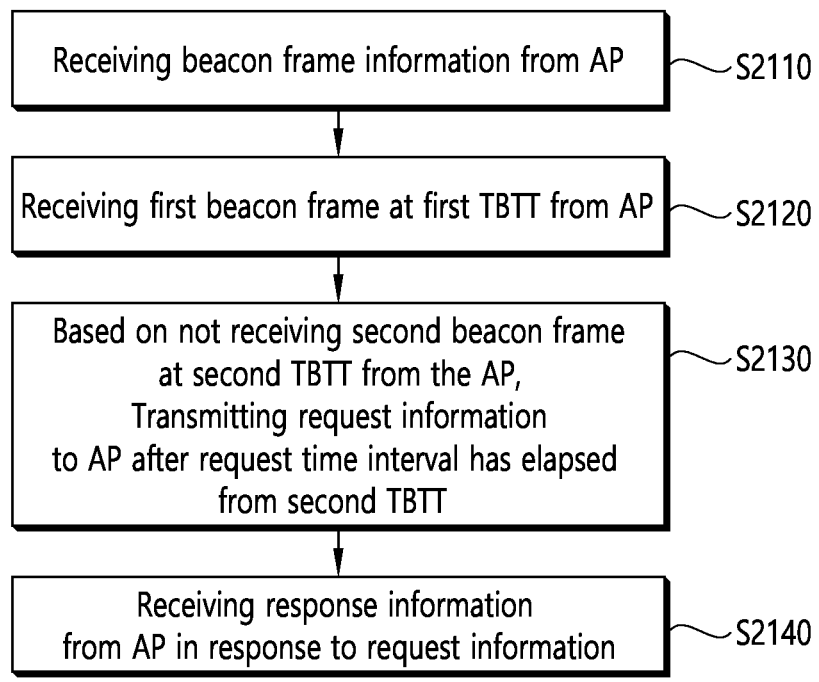
FIG. 21 is a flowchart of an example of a method performed by a non-AP STA in accordance with some implementations of the present disclosure.

Hereinafter, embodiments of the operation of the STA in which some or all of the technical features proposed herein are applied will be described. FIG. 21 is a flowchart of an example method performed by a non-AP STA in accordance with some implementations of the present disclosure.

Referring to FIG. 21, a STA receives beacon frame information from an AP (S2110). Here, the beacon frame information may include information about a time at which the beacon frame is transmitted, for example, a transmission period or beacon interval of the beacon frame, and information about a TBTT at which the beacon frame is transmitted. For example, the beacon frame information may indicate/inform/identify a first TBTT, a second TBTT, and/or a beacon interval between the first beacon frame and the second beacon frame.

The STA receives the first beacon frame in a first TBTT from the AP (S2120). Then, based on not receiving the second beacon frame in a second TBTT from the AP, the STA transmits request information to the AP after a request time interval has elapsed from the second TBTT (S2130). Here, the request information may include information requesting scheduling information for the restricted TWT operation. Further, the request information may be transmitted independently or in conjunction with data transmitted by the STA to the AP.

For example, the STA may obtain information about the first TBTT and the second TBTT via beacon frame information. Based on the beacon frame information, the STA may receive a first beacon frame from the first TBTT. Further, the STA may expect to receive a second beacon frame from the second TBTT based on the beacon frame information. In this case, the STA may not receive the second beacon frame. In this case, the STA may attempt to receive the second beacon frame until a request time interval has elapsed from the second TBTT. Once the request time interval has elapsed, the STA may request information from the AP to schedule a restricted TWT operation.

Further, the request time interval may be SIFS, PIFS, AIFS [AC], EIFS, ¼ of a beacon interval, ½ of a beacon interval, or ¾ of a beacon interval. Here, the requested time interval may be predefined or determined through the negotiation process of FIG. 18. Alternatively, the requested time interval may be indicated by a beacon frame. For example, the request time interval for reception of the second beacon frame may be indicated to the STA via the first beacon frame.

In response to the request information, the STA receives response information from the AP (S2140). Here, the response information may include scheduling information for the restricted TWT. For example, the scheduling information for the restricted TWT may include information about the SP of the restricted TWT. The STA may terminate the TXOP it has obtained before the SP of the restricted TWT starts.

Figure 22:
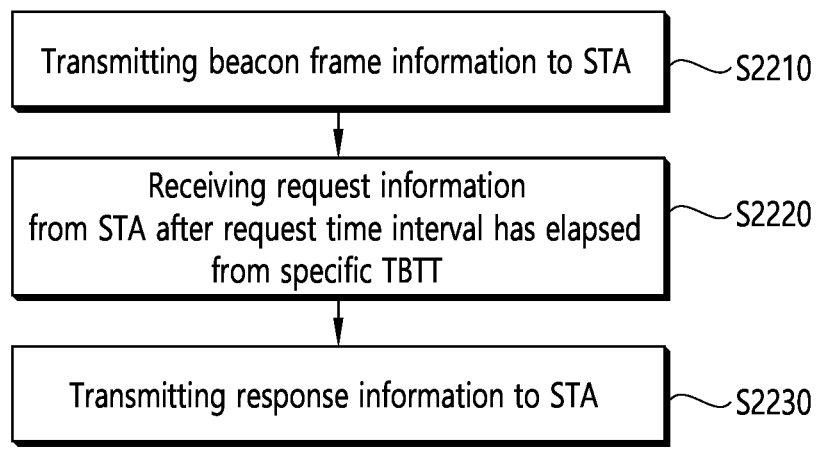
FIG. 22 is a flowchart of an example of a method performed by an AP, according to some implementations of the present disclosure.

FIG. 22 is a flowchart of an example of a method performed by an AP according to some implementations of the present disclosure.

Referring to FIG. 22, an AP transmits beacon frame information to a STA (S2210). The beacon frame information may indicate/inform/identify a TBTT of a beacon frame transmitted by the AP, and/or a beacon frame transmission interval (or beacon interval).

Also, here, the STA may not receive a beacon frame transmitted by the AP at a specific TBTT. Alternatively, the AP may not be able to transmit the beacon frames to the specific TBTT. The AP receives request information from the STA after the request time interval has elapsed from the specific TBTT (S2220). Here, the request information may include information requesting scheduling information for a restricted TWT operation. Further, the request information may be transmitted independently or may be transmitted in conjunction with data transmitted by the STA to the AP.

Further, wherein the request time interval may be predefined, or may be determined through the negotiation process of FIG. 18. The request time interval may be SIFS, PIFS, AIFS [AC], EIFS, ¼ of a beacon interval, ½ of a beacon interval, or ¾ of a beacon interval.

In response to the request information, the AP transmits response information to the STA (S2230). Here, the response information may include scheduling information for the restricted TWT.

The above-described technical features of the present disclosure may be applied to various devices and methods. For example, the technical features of the disclosure may be performed/supported by the apparatus of FIGS. 1 and/or 11. For example, the technical features of the disclosure may apply to only a portion of FIGS. 1 and/or 11. For example, the technical features of the disclosure may be implemented based on the processing chips 114, 124 of FIG. 1, or based on the processors 111, 121 and memory 112, 122 of FIG. 1, or based on the processor 610 and memory 620 of FIG. 11.

The technical features of the present disclosure may be implemented on a computer readable medium (CRM). For example, a CRM suggested by the present disclosure is at least one computer readable medium comprising instructions executable by at least one processor.

The CRM may store instructions to perform operations comprising: receiving beacon frame information from an access point (AP), wherein the beacon frame information includes information related to a time at which a beacon frame is transmitted; receiving a first beacon frame from the AP at a first Target Beacon Transmission Time (TBTT); based on not receiving a second beacon frame from the AP at a second TBTT, transmitting request information to the AP after a request time interval has elapsed from the second TBTT, wherein the request information includes information requesting scheduling information for a restricted Target Wake Time (TWT) operation; and receiving response information from the AP in response to the request information, wherein the response information includes the scheduling information for the restricted TWT operation. The instructions stored within the CRM of the present disclosure may be executed by at least one processor. The at least one processor associated with a CRM of the present disclosure may be the processors 111, 121 or processing chips 114, 124 of FIG. 1, or the processor 610 of FIG. 11. The CRM of the present disclosure may be the memory 112, 122 of FIG. 1 or the memory 620 of FIG. 11, or a separate external memory/storage medium/disk, etc.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyperparameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

Claims disclosed in the present specification can be combined in various ways. For example, technical features in method claims of the present specification can be combined to be implemented or performed in an apparatus, and technical features in apparatus claims of the present specification can be combined to be implemented or performed in a method. Further, technical features in method claims and apparatus claims of the present specification can be combined to be implemented or performed in an apparatus. Further, technical features in method claims and apparatus claims of the present specification can be combined to be implemented or performed in a method.

What is claimed is:

1. A method in a wireless Local Area Network (LAN) system, the method comprising:
   receiving, by a station (STA), beacon frame information from an access point (AP), wherein the beacon frame information includes information related to a time at which a beacon frame is transmitted;
   receiving, by the STA, a first beacon frame from the AP at a first Target Beacon Transmission Time (TBTT);
   based on not receiving a second beacon frame from the AP at a second TBTT, transmitting, by the STA, request information to the AP after a request time interval has elapsed from the second TBTT, wherein the request information includes information requesting scheduling information for a restricted Target Wake Time (TWT) operation; and
   receiving, by the STA, response information from the AP in response to the request information, wherein the response information includes the scheduling information for the restricted TWT operation.

2. The method of claim 1, wherein the beacon frame information informs the first TBTT, the second TBTT, and a beacon interval.

3. The method of claim 1, wherein the request time interval is one of a Short Inter-Frame Space (SIFS), a PCF Inter-Frame Space (PIFS), an Arbitration Inter-Frame Space (AIFS), an Extended Inter-Frame Space (EIFS), ¼ of a beacon interval, ½ of the beacon interval, and ¾ of the beacon interval.

4. The method of claim 1, wherein the first beacon frame informs the request time interval for receiving the second beacon frame.

5. The method of claim 1, wherein the request time interval is determined through a negotiation procedure performed by the STA with the AP, wherein the negotiation procedure is one of a probe request and probe response, and an association request and association response.

6. The method of claim 1, wherein the scheduling information informs a Service Period (SP) for the restricted TWT, wherein the STA terminates a transmission opportunity (TXOP) for the STA prior to a start of the SP.

7. A station (STA) in a wireless LAN system, comprising;
   a memory;
   a transceiver; and
   a processor operatively coupled to the memory and the transceiver,
   wherein the processor is adapted to:
      receive beacon frame information from an access point (AP), wherein the beacon frame information includes information related to a time at which a beacon frame is transmitted;
      receive a first beacon frame from the AP at a first Target Beacon Transmission Time (TBTT);
      based on not receiving a second beacon frame from the AP at a second TBTT, transmit request information to the AP after a request time interval has elapsed from the second TBTT, wherein the request information includes information requesting scheduling information for a restricted Target Wake Time (TWT) operation; and
      receive response information from the AP in response to the request information, wherein the response information includes the scheduling information for the restricted TWT operation.

8. A method in a wireless LAN system, the method comprising:
   transmitting, by an access point (AP), beacon frame information to a station (STA), wherein the beacon frame information includes information related to a time at which a beacon frame is transmitted;
   receiving, by the AP, request information from the STA after a request time interval has elapsed from a specific TBTT, wherein the request information includes information requesting scheduling information for a restricted Target Wake Time (TWT) operation; and
   transmitting, by the AP, response information to the STA in response to the request information, wherein the response information includes the scheduling information for the restricted TWT operation.

9. The method of claim 8, wherein the beacon frame information informs the specific TBTT.

10. The method of claim 8, wherein the request time interval is one of a Short Inter-Frame Space (SIFS), a PCF Inter-Frame Space (PIFS), an Arbitration Inter-Frame Space (AIFS), an Extended Inter-Frame Space (EIFS), ¼ of a beacon interval, ½ of the beacon interval, and ¾ of the beacon interval.

11. The method of claim 8, wherein the AP transmit the beacon frame at the specific TBTT.

12. The method of claim 8, wherein the request time interval is determined through a negotiation procedure performed by the STA with the AP, wherein the negotiation procedure is one of a probe request and probe response, and an association request and association response.

13. The method of claim 8, wherein the scheduling information informs a Service Period (SP) for the restricted TWT.

* * * * *